US008074472B2

(12) United States Patent
Farber et al.

(10) Patent No.: US 8,074,472 B2
(45) Date of Patent: Dec. 13, 2011

(54) GRINDING BEADS AND METHOD OF PRODUCING THE SAME

(75) Inventors: Boris Y. Farber, Solon, OH (US); John A. Kaniuk, Chagrin Falls, OH (US); Ricky A. Alexander, Pepper Pike, OH (US)

(73) Assignee: Zircoa Inc., Solon, OH (US)

( * ) Notice: Subject to any disclaimer, the term of this patent is extended or adjusted under 35 U.S.C. 154(b) by 327 days.

(21) Appl. No.: 11/830,955

(22) Filed: Jul. 31, 2007

(65) Prior Publication Data
US 2009/0036291 A1 Feb. 5, 2009

(51) Int. Cl.
*C03B 8/00* (2006.01)
*C03B 19/10* (2006.01)
(52) U.S. Cl. .................... 65/17.2; 65/21.1; 264/681
(58) Field of Classification Search ............. 65/17.1–22; 264/1.21, 5–14, 681; 501/33, 78, 39
See application file for complete search history.

(56) References Cited

U.S. PATENT DOCUMENTS

| | | | |
|---|---|---|---|
| 3,247,000 A | 4/1966 | Taylor | 106/57 |
| 3,454,385 A | 7/1969 | Amero | 51/298 |
| 3,529,946 A * | 9/1970 | La Due et al. | 65/30.14 |
| 3,640,093 A * | 2/1972 | Levene et al. | 65/17.2 |
| 3,891,408 A | 6/1975 | Rowse et al. | 51/295 |
| 3,916,585 A * | 11/1975 | Barks | 51/309 |
| 4,126,429 A | 11/1978 | Watson | 51/309 |
| 4,292,049 A | 9/1981 | Tanaka et al. | 51/309 |
| 4,316,964 A | 2/1982 | Lange | 501/105 |
| 4,525,464 A | 6/1985 | Claussen et al. | 501/103 |
| 4,621,936 A * | 11/1986 | Hansson et al. | 401/215 |
| 4,623,364 A | 11/1986 | Cottringer et al. | 51/309 |
| RE32,449 E | 6/1987 | Claussen et al. | 501/103 |
| 4,690,911 A | 9/1987 | Nakada | 501/105 |
| 4,751,207 A | 6/1988 | Manniing | 501/104 |
| 4,784,818 A | 11/1988 | Wakai et al. | 264/291 |
| 4,820,667 A | 4/1989 | Tsunekawa et al. | 501/104 |
| 4,879,260 A | 11/1989 | Manning | 501/32 |
| 4,913,708 A | 4/1990 | Kalinowski | 51/295 |
| 4,954,462 A | 9/1990 | Wood et al. | 501/95 |
| 4,956,128 A * | 9/1990 | Hommel et al. | 264/4 |
| 4,960,441 A | 10/1990 | Pellow et al. | 51/293 |
| 5,002,911 A | 3/1991 | Matsumoto et al. | 501/105 |

(Continued)

FOREIGN PATENT DOCUMENTS
GB 1192096 5/1970

(Continued)

OTHER PUBLICATIONS

Jing-Fong Tsai et al.; "Transformation Plasticity and Toughening in $CeO_2$-Partially-Stabilized Zirconia-Alumina (Ce-TZP/$Al_2O_3$) Composites Doped with MnO", J. Mater Res., vol. 5, No. 9, Sep. 1990, pp. 1948-1957.*

(Continued)

*Primary Examiner* — Matthew Daniels
*Assistant Examiner* — Jodi F Cohen
(74) *Attorney, Agent, or Firm* — Kusner & Jaffe

(57) ABSTRACT

A ceramic consisting essentially of:
about 51% to about 68% by weight $ZrO_2$;
about 20% to about 40% by weight $Al_2O_3$;
about 9% to about 12% by weight $CeO_2$;
about 0.05% to about 0.2% by weight $SiO_2$;
about 0.01% to about 0.1% by weight MgO;
about 0.1% to about 0.6% by weight MnO; and
about 0.01% to about 0.8% by weight CaO.

5 Claims, 2 Drawing Sheets

U.S. PATENT DOCUMENTS

| | | | |
|---|---|---|---|
| 5,009,676 A * | 4/1991 | Rue et al. | 51/309 |
| 5,064,783 A | 11/1991 | Luckevich | 501/12 |
| 5,082,809 A | 1/1992 | Hayashi | 501/105 |
| 5,215,551 A | 6/1993 | Hatanaka et al. | 51/293 |
| 5,429,647 A * | 7/1995 | Larmie | 51/295 |
| 5,484,559 A | 1/1996 | Johns | 264/9 |
| 5,683,481 A | 11/1997 | Chatterjee et al. | 65/17.3 |
| 5,728,636 A | 3/1998 | Nawa et al. | 501/105 |
| 5,854,158 A * | 12/1998 | Nawa et al. | 501/104 |
| 5,863,850 A | 1/1999 | Nawa et al. | 501/105 |
| 5,877,105 A * | 3/1999 | Iwai et al. | 501/105 |
| 6,187,381 B1 * | 2/2001 | Tanabe et al. | 427/344 |
| 6,403,676 B1 * | 6/2002 | Jia et al. | 523/116 |
| 6,408,648 B1 * | 6/2002 | Morizane | 65/17.2 |
| 6,509,287 B2 | 1/2003 | Boussant-Roux et al. | 501/105 |
| 6,624,106 B2 | 9/2003 | Cohen | 501/105 |
| 6,797,203 B2 * | 9/2004 | Vlach et al. | 264/8 |
| 7,012,036 B2 | 3/2006 | Nawa et al. | 501/105 |
| 7,056,851 B2 | 6/2006 | Nawa | 50/105 |
| 7,148,167 B2 | 12/2006 | Shikata et al. | 501/105 |
| 2002/0010071 A1 | 1/2002 | Cohen | 501/105 |
| 2002/0013212 A1 | 1/2002 | Boussant-Roux et al. | 501/105 |
| 2003/0109372 A1 | 6/2003 | Hasegawa et al. | 501/95.1 |
| 2003/0172594 A1 | 9/2003 | Castro et al. | 51/307 |
| 2004/0007789 A1 * | 1/2004 | Vlach et al. | 264/8 |
| 2004/0067839 A1 | 4/2004 | Nawa et al. | 501/105 |
| 2005/0049137 A1 | 3/2005 | Shikata et al. | 501/105 |
| 2005/0056055 A1 * | 3/2005 | Celikkaya et al. | 65/17.4 |
| 2005/0079971 A1 | 4/2005 | Nawa | 501/105 |
| 2005/0272591 A1 | 12/2005 | Nawa et al. | 501/105 |
| 2006/0175584 A1 | 8/2006 | Kwon et al. | 252/520.2 |
| 2006/0178257 A1 | 8/2006 | Shikata et al. | 501/105 |
| 2010/0162771 A1 * | 7/2010 | Just | 65/440 |

FOREIGN PATENT DOCUMENTS

| | | |
|---|---|---|
| JP | 56014473 | 2/1981 |
| JP | 60204667 | 10/1985 |
| JP | 1234354 | 9/1989 |
| JP | 3265563 | 11/1991 |
| JP | 7291722 | 11/1995 |
| JP | 11314971 | 11/1999 |
| JP | 2005239469 | 9/2005 |
| WO | WO 9407809 A1 * | 4/1994 |
| WO | WO 2005/075375 | 8/2005 |

OTHER PUBLICATIONS

Tsukuma et al., *Strength and Fracture Toughness of Y-TZP, Ce-TZP, Y-TZP/$Al_2O_3$, and Ce-TZP/$Al_2O_3$*, Advances in Ceramics, vol. 24; Science and Technology of Zirconia III, The American Ceramic Society, Inc., 1988. pp. 721-728.

* cited by examiner

GRINDING BEADS AND METHOD OF PRODUCING THE SAME

FIELD OF THE INVENTION

The present invention relates generally to grinding media for milling minerals and inorganic substances and, more particularly, to ceramic beads and balls used in such milling operations.

BACKGROUND OF THE INVENTION

The use of ceramic beads and balls in milling and grinding minerals and inorganic substances is known. The beads and balls are preferably formed of ceramic materials that exhibit high toughness, high hardness, good strength, and high wear resistance. It is known to use beads and balls that are formed of alumina or zirconia that is stabilized or partially stabilized by means of yttrium oxide, cerium oxide, or magnesium oxide (among others). It is also known to use beads formed of alumina-zirconia-silica and zirconium silicate.

The present invention provides grinding media and, more specifically, beads formed of an alumina-zirconia composition having improved hardness and wear resistance, as compared to milling media known heretofore. A composition with better properties than conventional alumina-zirconia-silica is also demonstrated.

SUMMARY OF THE INVENTION

In accordance with a preferred embodiment of the present invention, there is provided a method of forming alumina-zirconia beads, comprising the steps of:
(a) forming a slip comprised of about 50% to about 70% by weight water and about 30% to about 50% by weight of a mixture of metal oxides, the mixture comprised of:
  about 20% to about 40% by weight of alumina,
  about 9% to about 12% by weight of ceria, and
  about 51% to about 68% of monoclinic zirconia;
(b) milling the slip;
(c) adding manganese oxide (MnO) to the slip in a concentration of about 0.1% to about 1% by weight, based upon the final weight of the mixture of metal oxides;
(d) adding an ammonia-containing binding agent to the slip at a concentration of about 1.1% by weight;
(e) forming beads by dropping the slip into a calcium chloride ($CaCl_2$) solution wherein drops of the slip gel into beads containing calcium chloride ($CaCl_2$);
(f) washing the beads until the calcium content of the beads (on a calcium oxide basis) is between about 0.01% and about 0.8% by weight to the weight of the mixture of the metal oxides;
(g) drying the beads; and
(h) firing the beads at a temperature between about 1,320° C. and about 1,400° C. for about 2 hours to about 8 hours.

In accordance with another aspect of the present invention, there is provided a ceramic consisting essentially of:
  about 51% to about 68% by weight $ZrO_2$;
  about 20% to about 40% by weight $Al_2O_3$;
  about 9% to about 12% by weight $CeO_2$;
  about 0.05% to about 0.2% by weight $SiO_2$;
  about 0.01% to about 0.1% by weight MgO;
  about 0.1% to about 0.6% by weight MnO; and
  about 0.01% to about 0.8% by weight CaO.

An advantage of the present invention are milling beads formed of alumina-zirconia having improved hardness, compared to milling beads known heretofore.

Another advantage of the present invention are milling beads, as described above, having improved wear resistance.

Another advantage of the present invention are milling beads as described above that produce reduced wear on milling equipment.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
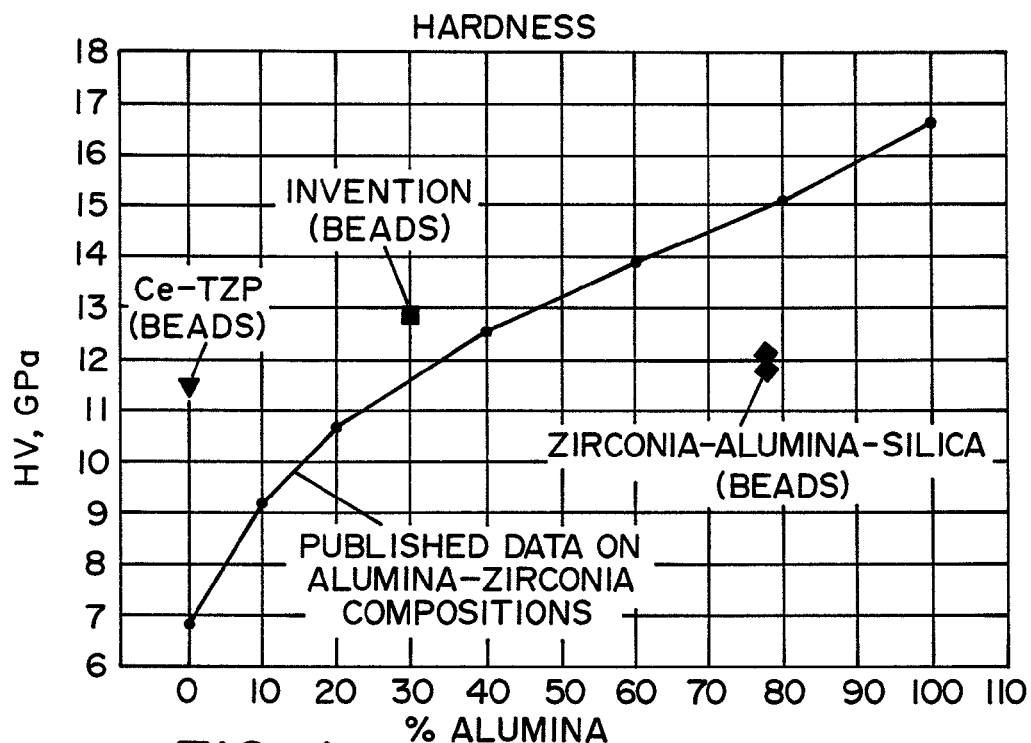
FIG. 1 is a graph showing the hardness of alumina-zirconia beads produced in accordance with the present invention as compared to zirconia-alumina-silica beads, Ce-TZP beads, and conventional alumina-zirconia compositions.

The present invention relates to alumina-zirconia and, more particularly, to alumina-zirconia beads. Alumina-zirconia beads formed according to the present invention preferably have the following chemical composition, by weight percent;
  about 51% to about 68% by weight $ZrO_2$;
  about 20% to about 40% by weight $Al_2O_3$;
  about 9% to about 12% by weight $CeO_2$;
  about 0.05% to about 0.2% by weight $SiO_2$;
  about 0.01% to about 0.1% by weight MgO;
  about 0.1% to about 0.6% by weight MnO; and
  about 0.01% to about 0.8% by weight CaO.

In accordance with one aspect of the present invention, the foregoing ceramic is formed by a "sol-gel" process. In accordance with a preferred process, high-surface area alumina ($Al_2O_3$) is milled in water until approximately 50% of the particles within the alumina ($Al_2O_3$) have a diameter of about 0.40 microns (μm) to about 0.45 microns (μm). In one embodiment, the alumina ($Al_2O_3$) particles have a diameter of about 0.43 microns (μm). Water comprises about 60% by weight of the resultant mixture of water and alumina ($Al_2O_3$). The milled alumina ($Al_2O_3$) is then added to a slip comprised of about 60% by weight of water and a milled mixture of monoclinic zirconia and ceria. Within this mixture, ceria is about 15% by weight. The milled alumina ($Al_2O_3$) is added to the mixture of monoclinic zirconia and ceria, so as to produce a "slip" having about 30% by weight alumina ($Al_2O_3$). The water, alumina ($Al_2O_3$), and ceria-zirconia are further milled.

Manganese oxide (MnO), in the form of a dry powder, is added to the slip in a concentration range of about 0.1% to about 1% by weight, i.e., based upon the final mixture weight of alumina ($Al_2O_3$) and ceria-zirconia. The manganese oxide (MnO) is added as a sintering aid as shall be described in greater detail below.

As will be appreciated by those skilled in the art, alumina ($Al_2O_3$) and zirconia ($ZrO_2$) typically contains small amounts of impurities, such as magnesium oxide (MgO) and silicon dioxide ($SiO_2$). These impurities exist in most alumina ($Al_2O_3$) and zirconia ($ZrO_2$) in relatively small amounts. In accordance with one aspect of the present invention, it is desirable that specific amounts of magnesium oxide (MgO) be present in the resultant alumina-zirconia bead. Accordingly, magnesium oxide (MgO) may be added to the aforementioned slip. Magnesium oxide (MgO) is added as an exaggerated grain growth inhibitor and is preferably added such that the magnesium oxide (MgO) concentration is about 0.02% to about 0.1% by weight of the alumina ($Al_2O_3$) and ceria-zirconia. The addition of magnesium oxide (MgO) to the slip may not be required if the alumina ($Al_2O_3$) within the slip contains sufficient magnesium oxide (MgO) to meet the desired concentration range.

The resultant slip mixture is then milled until the average particle diameter of the alumina ($Al_2O_3$) and ceria-zirconia is about 0.40 microns ($\mu$m) to about 0.45 microns ($\mu$m). In one embodiment, the slip is milled until the average particle diameter of the alumina ($Al_2O_3$) and ceria-zirconia is about 0.43 microns ($\mu$m). The water composition of the final mixture is preferably about 55% to 65% by weight.

A binding agent is then added to the final slip mixture at a concentration of about 1.1% by weight to form a sol. In accordance with one embodiment of the present invention, an ammonia-based alginate, sold under the trade name Collatex™, is added to the slip mixture.

Forming the ceramic beads comprises dropping the aforementioned "sol" into a calcium chloride ($CaCl_2$) solution, wherein drops of the sol gel into beads. A chemical reaction between the ammonia-based alginate binder and the calcium chloride solidifies the sol into relatively solid beads. These beads contain residual calcium chloride ($CaCl_2$) as a result of the sol-gel process. The resultant individual beads have a size that can range between 0.5 mm and 5 mm.

The resultant beads are then washed until the calcium content of the beads, based on a calcium oxide basis, is between about 0.01% and about 0.8% by weight relative to the weight of the metal oxides within the beads. The resultant beads are then dried. The dried beads are fired at a temperature of between about 1,320° C. and about 1,400° C. for about 2 hours to about 8 hours. During the firing process, the silicon dioxide ($SiO_2$) and manganese oxide (MnO) within the sol (slip) act as sintering aids. The magnesium oxide (MgO) and calcium oxide (CaO) act as a stabilizer. Magnesium oxide (MgO) also acts to inhibit exaggerated grain growth.

The resultant alumina-zirconia beads exhibit higher hardness than conventionally formed alumina-zirconia compositions, while maintaining fracture toughness suitable for milling and grinding operations and resulting in lower wear.

The present invention shall now be further described with respect to specific examples of the present invention. Alumina-zirconia beads are formed according to the foregoing process.

More specifically, a high surface area alumina is milled in water until the diameter of about 50% of the particles is about 0.43 microns. The resultant mixture contains about 60% by weight water. The milled alumina is then added to a milled mixture of ceria and zirconia so as to produce a "slip" having about 30% by weight alumina. This slip is then further milled. Manganese oxide (sintering aid), as a dry powder, is added to the slip in a concentration range of about 1% by weight, i.e., based on the final mixture weight of alumina, ceria and zirconia. MgO(MgOH) in a concentration range of about 0.25%-0.4% by weight is then added to the alumina, ceria and zirconia mixture. This final mixture is milled until the average particle diameter is about 0.43 microns. The water composition of this final mixture is about 60% by weight. Collatex™ (binding agent) is added to this final mixture at a concentration of about 1.1% by weight to form a sol. This sol (slip) is dropped into a calcium chloride ($CaCl_2$) solution. Beads are formed due to surface tension of the slip. Beads are solidified by gelling due to a chemical reaction between the Collatex™ binder and the $CaCl_2$. After the composition is sufficiently gelled so that the beads can be handled, the beads are then washed, dried and fired. The firing temperature is in the temperature range of 1,320° C. to 1,400° C. (for approximately 6 hours).

The alumina-zirconia beads formed according to the foregoing process have the following composition:

| Alumina-Zirconia | |
|---|---|
| Element | Weight % |
| $ZrO_2$ | 57.74 |
| $Al_2O_3$ | 30.38 |
| $CeO_2$ | 10.68 |
| MnO | 0.26 |
| CaO | 0.69 |
| $SiO_2$ | 0.13 |
| MgO | 0.06 |
| $Fe_2O_3$ | 0.05 |
| $TiO_2$ | 0.01 |

As will be appreciated by those skilled in the art, $Fe_2O_3$ and $TiO_2$ components of the beads result from impurities typically found in alumina ($Al_2O_3$) and zirconia ($ZrO_2$).

FIG. 1 is a graph showing the hardness of alumina-zirconia beads formed as described above compared to published data on known conventional alumina-zirconia compositions, taken from Tsukuma et al., *Strength and Fracture Toughness of Y-TZP, Ce-TZP, Y-TZP/$Al_2O_3$, and Ce-TZP/$Al_2O_3$*, Advances in Ceramics, Vol. 24; Science and Technology of Zirconia III, The American Ceramic Society, Inc., 1988. As shown in FIG. 1, beads formed according to the present invention exhibited hardness greater than the hardness properties of conventional alumina-zirconia compositions.

Figure 2:
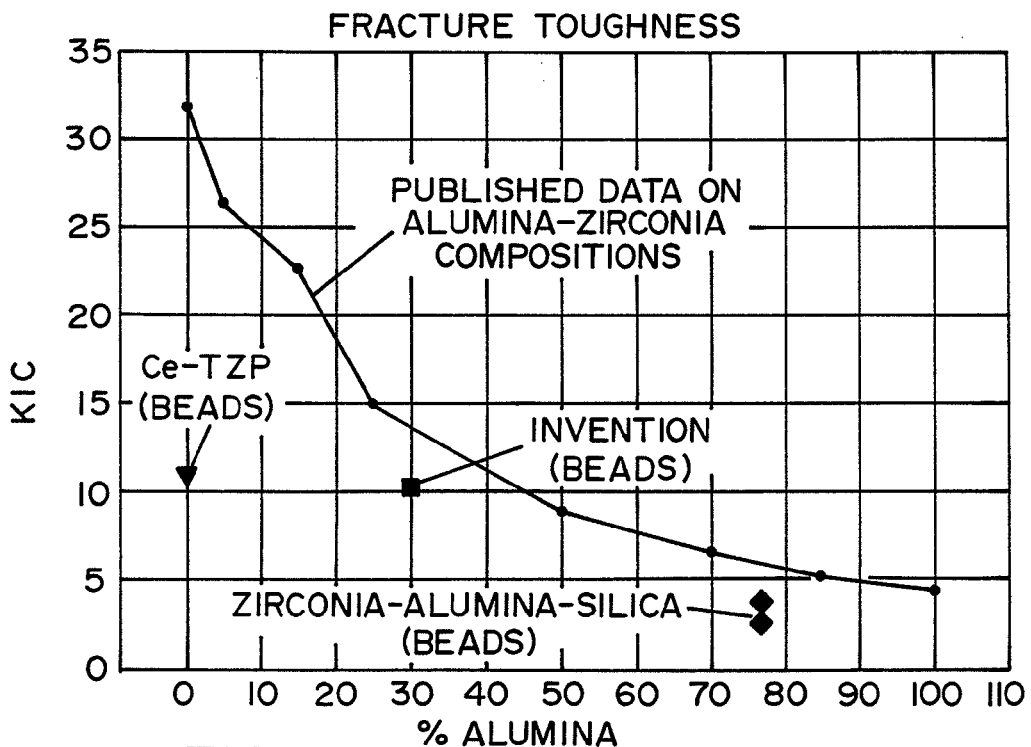
FIG. 2 is a graph showing the fracture toughness of alumina-zirconia beads produced in accordance with the present invention as compared to zirconia-alumina-silica beads, Ce-TZP beads, and conventional alumina-zirconia compositions.

FIG. 2 shows the fracture toughness for the same alumina-zirconia beads. As illustrated in FIG. 2, the fracture toughness was slightly less than the properties of conventional alumina-zirconia compositions, but still within the acceptable range for grinding media.

Figure 3:
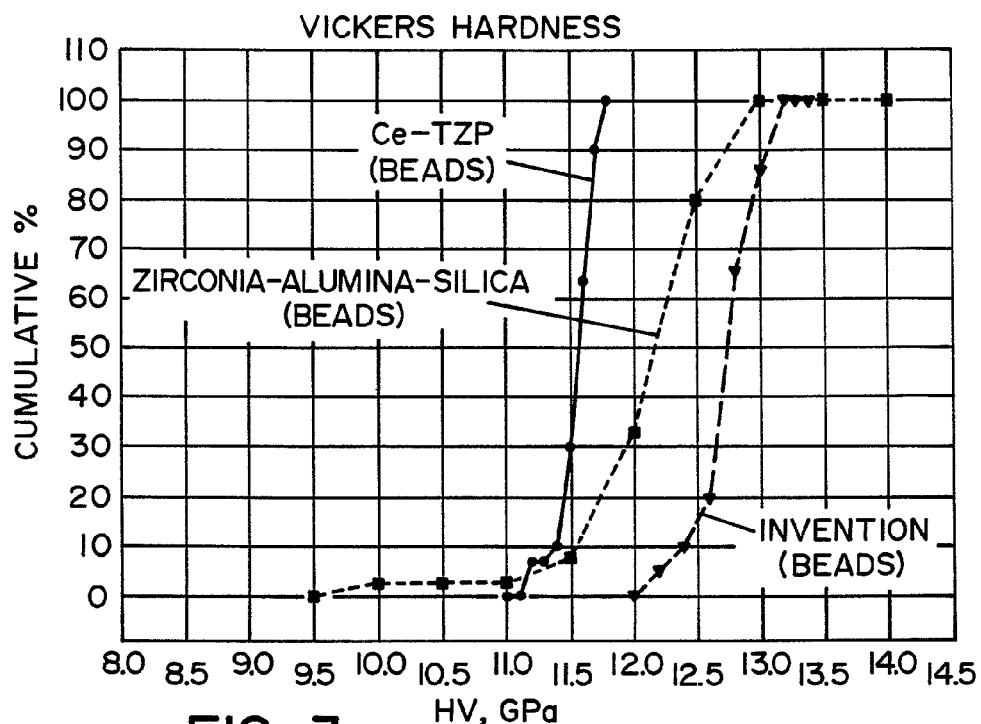
FIG. 3 is a graph showing the hardness of alumina-zirconia beads formed in accordance with the present invention as compared to Ce-TZP and zirconia-alumina-silica beads.
Figure 4:
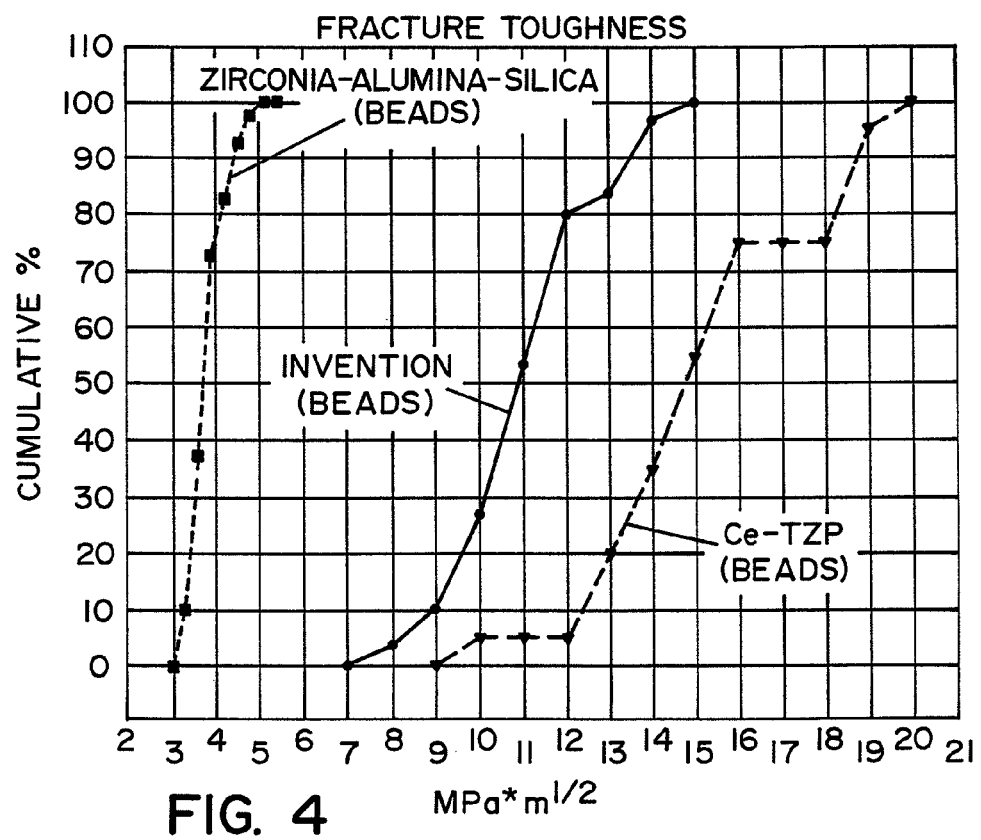
FIG. 4 is a graph showing the fracture toughness of alumina-zirconia beads formed in accordance with the present invention as compared to Ce-TZP and zirconia-alumina-silica beads.

FIGS. 3-4 compare the resultant alumina-zirconia beads against conventional Ce-TZP beads and alumina-zirconia-silica beads having the following compositions.

| Element | Ceria-TZP Weight % | Alumina-Zirconia-Silica Weight % |
|---|---|---|
| $ZrO_2$ | 83.79 | 13.83 |
| $Al_2O_3$ | 0.03 | 77.42 |
| $CeO_2$ | 15.28 | — |
| MnO | 0.34 | — |
| CaO | 0.42 | 0.64 |
| $SiO_2$ | 0.09 | 6.39 |
| MgO | 0.02 | 0.11 |

-continued

| Element | Ceria-TZP Weight % | Alumina-Zirconia-Silica Weight % |
|---|---|---|
| $Fe_2O_3$ | 0.01 | 0.34 |
| $TiO_2$ | 0.01 | 0.04 |
| $Y_2O_3$ | — | 1.23 |

As illustrated in FIGS. 3-4, the alumina-zirconia beads formed in accordance with the present invention exceeded the Vickers hardness of conventional Ce-TZP beads and of conventional alumina-zirconia-silica beads. Alumina-zirconia beads formed in accordance with the present invention also exceeded fracture toughness of conventional alumina-zirconia-silica beads.

Alumina-zirconia beads, formed as described above, are tested against Ce-TZP beads (as described above) and conventional alumina-zirconia-silica beads in a conventional mill. Testing indicates that the wear of commercially available zirconium silicate beads is four to five times greater than the wear of alumina-zirconia beads formed in accordance with the present invention. In addition, Y-TZP beads are not directly compared based upon historical data indicating poor performance in aqueous environments due to inherently low resistance to hydration. As neither composition is considered viable, results of the testing are not included here. The following TABLE 1 compares wear characteristics of the respective beads.

TABLE 1

| Bead Type | Bead Weight Loss (% in 1 h) | Average Equipment Weight Loss (%/h) | Ratio Bead Wear | Ratio Equipment Wear |
|---|---|---|---|---|
| Alumina-Zirconia-Silica | 2.70 | 0.44 | 1 | 1 |
| Ce-TZP | 0.23 | 0.13 | 0.09 | 0.29 |
| Alumina-Zirconia | 0.12 | 0.11 | 0.05 | 0.26 |

According to TABLE 1, wear resistance of alumina-zirconia beads formed according to the disclosed process exceeds wear resistance of conventional Ce-TZP beads and alumina-zirconia-silica beads. TABLE 1 also shows that alumina-zirconia beads formed according to the disclosed process exhibit reduced wear of the milling equipment as compared with wear of conventional Ce-TZP beads and alumina-zirconia-silica beads.

TABLE 1 also shows improvements in wear resistance of alumina-zirconia beads formed according to the disclosed process versus conventional Ce-TZP and alumina-zirconia-silica beads in a wear test with a sample of an ore slip.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method of forming alumina-zirconia beads, comprising the steps of:
   (a) forming a slip comprised of about 50% to about 70% by weight water and about 30% to about 50% by weight of a mixture of metal oxides, said mixture comprised of:
   about 20% to about 40% by weight of alumina ($Al_2O_3$),
   about 9% to about 12% by weight ceria, and
   about 51% to about 68% of monoclinic zirconia;
   (b) milling said slip;
   (c) adding manganese oxide (MnO) to said slip in a concentration of about 0.1% to about 1% by weight, based upon the final weight of said mixture of metal oxides;
   (d) adding an ammonia-containing binding agent to said slip at a concentration of about 1.1% by weight;
   (e) forming beads by dropping said slip into a calcium chloride ($CaCl_2$) solution wherein drops of said slip gel into beads in said calcium chloride ($CaCl_2$) solution;
   (f) washing said beads to remove said calcium chloride therefrom, said beads being washed until the calcium content of said beads (on a calcium oxide basis) is between about 0.01% and about 0.8% by weight to said weight of said mixture of said metal oxides;
   (g) drying said beads; and
   (h) firing said beads at a temperature between about 1,320° C. and about 1,400° C. for about 2 hours to about 8 hours.

2. A method as defined in claim 1, wherein said mixture of metal oxides includes about 0.05% to about 0.2% by weight of silicon dioxide ($SiO_2$) and about 0.01% to about 0.1% by weight of magnesium oxide (MgO).

3. A method as defined in claim 2, wherein said silicon dioxide ($SiO_2$) and magnesium oxide (MgO) are impurities in said alumina ($Al_2O_3$).

4. A method as defined in claim 1, wherein said alumina ($Al_2O_3$) has an average particle size of about 0.43 microns (μm).

5. A method as defined in claim 1, wherein said metal oxides in said slip have an average particle size of about 0.43 microns (μm).

* * * * *